July 29, 1930.  J. K. MOHR  1,771,731
VENTILATOR
Filed April 11, 1927  3 Sheets-Sheet 2
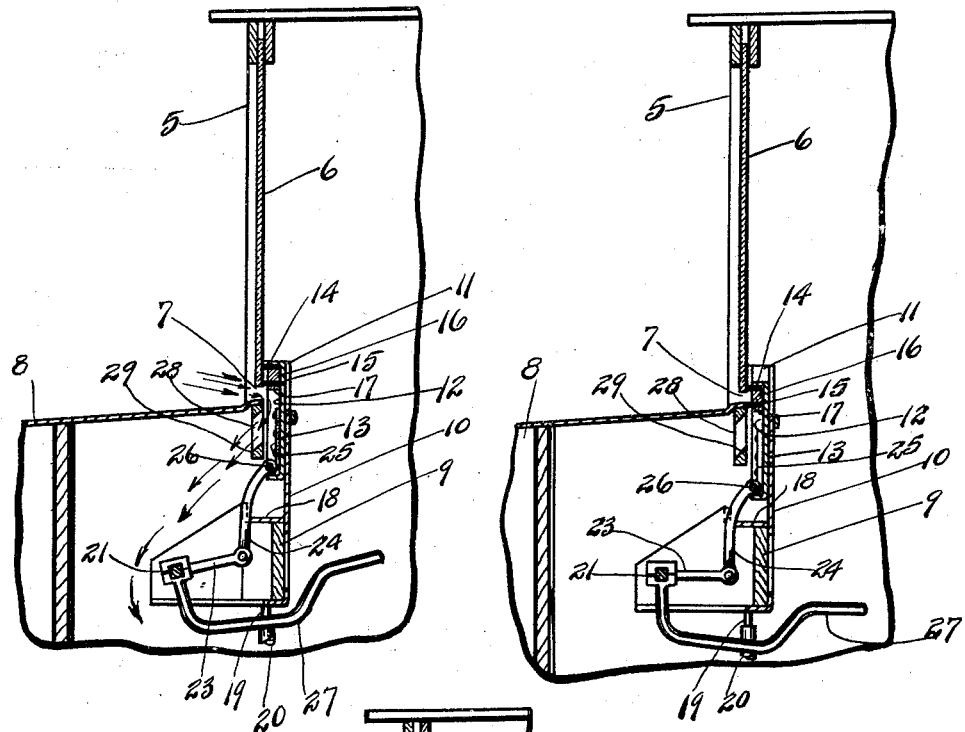
Inventor
John Kohler Mohr,
Frank C. Searman,
Attorney

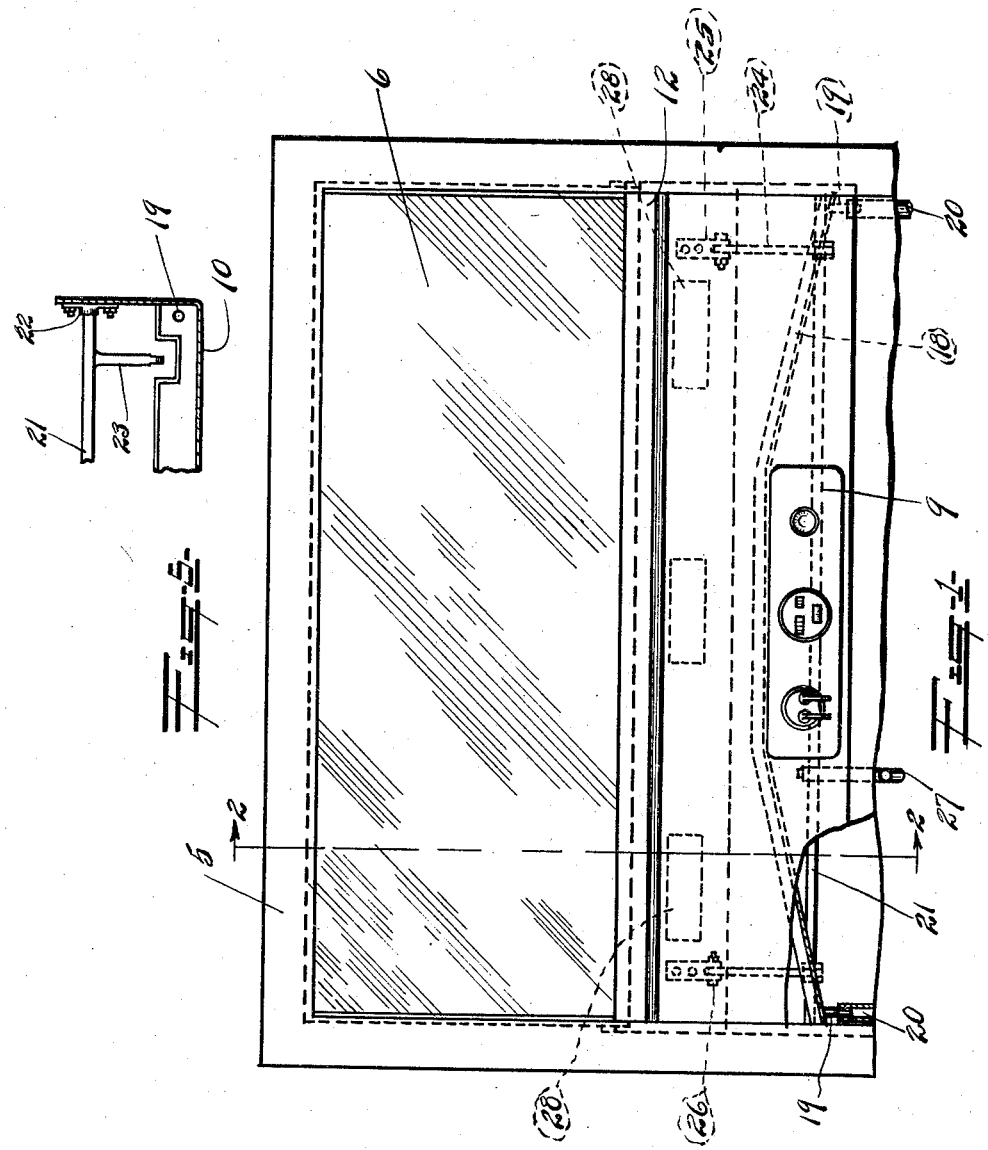

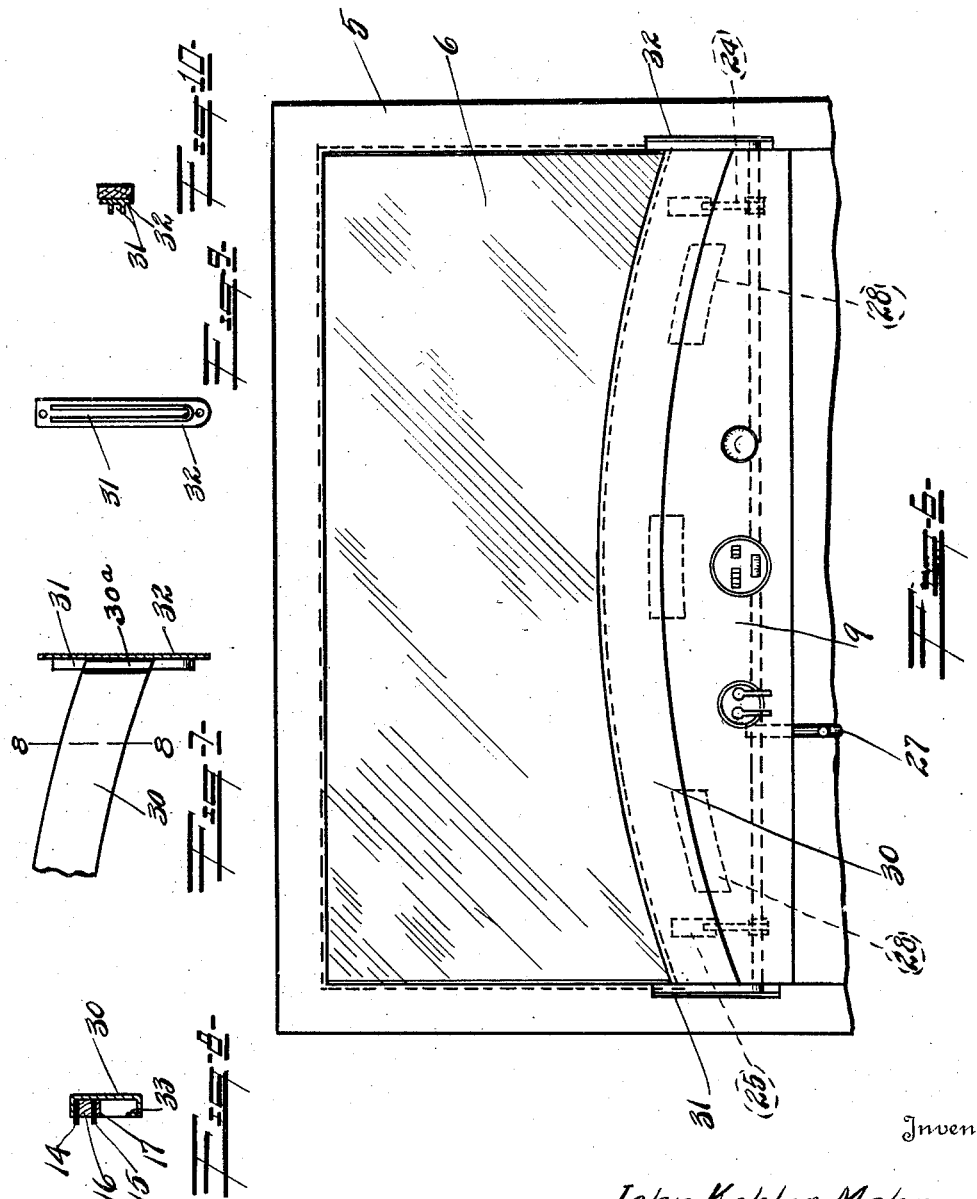

Patented July 29, 1930

1,771,731

UNITED STATES PATENT OFFICE

JOHN KOHLER MOHR, OF BAY CITY, MICHIGAN, ASSIGNOR TO ANNEMARIE MOHR, OF BAY CITY, MICHIGAN

VENTILATOR

Application filed April 11, 1927. Serial No. 182,666.

This invention relates to ventilators for automotive vehicles and the like.

The prime object of the invention is to provide an elongated vent or opening together with a vertically adjustable panel for opening or closing said vent so that as the vehicle is driven, air may be admitted to the interior of a closed body, either by direct opening or vent, or by an indirect passage opening which conducts the air currents downwardly and beneath the vehicle instrument board.

Another object of the invention is to design an adjustable panel which can be readily applied to vehicles in the process of construction, or which can be added to used cars if desired.

A further object is to design a simple, economical and substantial ventilator mechanism which is easy to operate and adjust.

The above and other objects will appear as the specification progresses, reference being had to the accompanying drawings in which I have shown the preferred embodiment of my invention and in which like reference numerals indicate like parts throughout the several views thereof.

In the drawings:

Fig. 1 is a fragmentary elevation of the inside of a conventional vehicle body showing my adjustable panel in closed position.

Fig. 2 is a fragmentary transverse vertical sectional view of the windshield and adjustable panel taken on the line 2—2 of Fig. 1.

Fig. 3 is a view similar to Fig. 2 showing the adjustable panel in position for indirect ventilation.

Fig. 4 is a similar view showing the panel in position for direct ventilation.

Fig. 5 is a fragmentary detail plan view of one end of the frame, rod and bearings.

Fig. 6 is a view similar to Fig. 1 and showing the lower end of the windshield curved.

Fig. 7 is a fragmentary detail showing the sliding panel and guide.

Fig. 8 is a transverse sectional view through the line 8—8 of Fig. 7.

Fig. 9 is an enlarged detail of one of the panel guides.

Fig. 10 is a sectional plan view through one of the guides.

Referring now particularly to the drawings, the numeral 5 indicates the windshield frame of a conventional vehicle body in which a single glass panel 6 is mounted, the frame being of the usual construction with the exception that the lower frame member is eliminated and an elongated vent or opening 7 is provided between the lower edge of the glass and the hood 8 of the body, and in Figs. 1 to 4 inclusive of the drawings, I have shown the lower edge of the glass panel as straight, but it may be curved as shown in Fig. 6, if desired, or the frame may be set at an angle without effecting the operation or in any manner departing from the spirit of the invention.

The instrument board 9 can be of any convenient design, and is rigidly secured in its customary position in the body, the ventilating mechanism comprising a transversely disposed frame 10 rigidly secured in position by means of rivets or the like, (not shown), and having vertically disposed tracks or guides 11 in which the vertically adjustable ventilator panel member 12 is slidably mounted. This ventilator can be of any desired material and construction, and in the present instance I have shown a channel shaped member 13, provided with spaced apart rubber weather strips 14 and 15, with a member 16 interposed therebetween, a strip 17 being provided for holding the lower member 15 in position, these members 13, 14, 15, and 16 being held in proper relation by bolts or in any other approved manner.

A drain trough 18 is soldered to the front wall of the frame 10 and is shaped as clearly shown in Fig. 1 of the drawings, a drain pipe 19 opening into the ends of the trough, and telescoping into a larger pipe 20 leading to the exterior of the body for leading the water from the trough, water enters only when the vehicle is being driven in the rain, and when the ventilator is in position as shown in Fig. 3.

A transversely disposed rod 21 is mounted in the frame, the ends being rounded and are journaled in a bearing 22 secured to the frame, spaced apart arms 23 being formed integral with or secured to said rod, and are pivotally connected to links 24, which are in turn pivotally connected to strap bearings 25 by means of bolts 26, these bearings being rigidly secured to the front side of the frame, the trough being shaped to permit the necessary movement of said links, and as shown in Fig. 5.

An operating handle 27 is secured to the rod 21 and extends rearwardly beyond the instrument board, being preferably located directly adjacent the steering wheel post and convenient to the driver, and when the handle is in position as shown in Fig. 2 of the drawings, the vent or opening 7 is closed, and no air is admitted at this point, the rubber strip 14 and 15 forming a tight waterproof joint; when the hand is moved to position as shown in Fig. 3 the ventilator 12 is simultaneously moved upwardly, and the vent 7 is opened, the air entering the body as indicated by the several arrows, flowing through the several openings 28 which are provided in the transversely disposed cross member 29, the lower strip 15 providing a tight joint between the panel and the windshield, and this I term indirect ventilation; when the lever is moved to position as shown in Fig. 4 the ventilator is simultaneously shifted downwardly, the upper rubber strip 14 being flush with the upper edge of the hood and forming a tight joint, the air entering as indicated by the arrows, and providing direct ventilation.

In Fig. 6 of the drawings I have shown a curved windshield, the adjustable ventilator panel 30 being also curved, the construction otherwise being exactly the same, excepting that the ends 30ª are thin and engage and slide in guides 31 provided in the members 32, these members being in turn secured to the sides of the body, the trough being formed by turning the lip 33 of the panel 30 as shown in Fig. 8, the operating mechanism being exactly the same.

From the foregoing description it will be obvious that I have perfected a very simple, effective and economical ventilating mechanism for automotive bodies and the like.

What I claim is:—

1. A vehicle body provided with an elongated vent between the windshield and the body, a vertically adjustable panel slidably mounted in the body, and adapted in one position to direct the incoming air currents downwardly, and in another position to permit a direct unobstructed opening, and manually operable means for adjusting said panel.

2. A vehicle body provided with an elongated opening between the windshield and the body, a panel slidably and adjustably mounted in said body and adapted in one position to admit air directly to the body, and in another position to direct the air currents downwardly and beneath the panel, resilient strips on the panel and adapted to cooperate with the windshield and body respectively when in different positions, and means for adjusting said panel.

3. A vehicle body provided with an elongated opening between the lower edge of the windshield and the body, a vertically adjustable panel slidably mounted in said body, and adapted in one position to form a weatherproof closure for said opening, in another position to direct the incoming air currents downwardly and beneath the panel, and in another position to permit an unobstructed opening directly into the body, and means for adjusting said panel.

In testimony whereof I hereunto affix my signature.

JOHN KOHLER MOHR.